US008621110B2

(12) United States Patent
Okabe

(10) Patent No.: US 8,621,110 B2
(45) Date of Patent: Dec. 31, 2013

(54) IMAGE FORMING APPARATUS AND CONTROL METHOD THEREFOR

(75) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/009,286

(22) Filed: Jan. 19, 2011

(65) Prior Publication Data

US 2011/0191464 A1 Aug. 4, 2011

(30) Foreign Application Priority Data

Feb. 2, 2010 (JP) ................................ 2010-021588

(51) Int. Cl.
*G06F 15/16* (2006.01)

(52) U.S. Cl.
USPC ........... 709/249; 709/219; 709/223; 709/224; 709/220; 709/229; 710/100; 358/1.15

(58) Field of Classification Search
USPC ......... 709/249, 245, 238, 250, 224, 219, 220, 709/223, 225, 229; 710/100; 358/1.15
See application file for complete search history.

(56) References Cited

U.S. PATENT DOCUMENTS

| | | | | |
|---|---|---|---|---|
| 8,082,328 | B2 * | 12/2011 | Hull et al. | 709/219 |
| 8,171,190 | B2 * | 5/2012 | Byun et al. | 710/100 |
| 2004/0019671 | A1 * | 1/2004 | Metz | 709/223 |
| 2005/0091411 | A1 * | 4/2005 | Michaiel et al. | 709/249 |

FOREIGN PATENT DOCUMENTS

| | | |
|---|---|---|
| JP | 2008152725 A | 7/2008 |

* cited by examiner

*Primary Examiner* — Kyung H Shin
(74) *Attorney, Agent, or Firm* — Fitzpatrick, Cella, Harper & Scinto

(57) ABSTRACT

When a document, printing of which is designated, does not have a printable file format, an image forming apparatus determines whether a document management server which manages the document exists on the same network as that of the image forming apparatus. When it is determined that the document management server does not exist on the same network, the image forming apparatus acquires a file format printable by another image forming apparatus present on the same network, and transmits it to the document management server. The document management server receives the file format printable by the other image forming apparatus, and notifies the image forming apparatus of a list of an image forming apparatus or apparatuses capable of printing the document. Upon receiving the notification, the image forming apparatus instructs an image forming apparatus capable of printing the document about substitute printing. The instructed image forming apparatus substitute-prints the document.

3 Claims, 13 Drawing Sheets

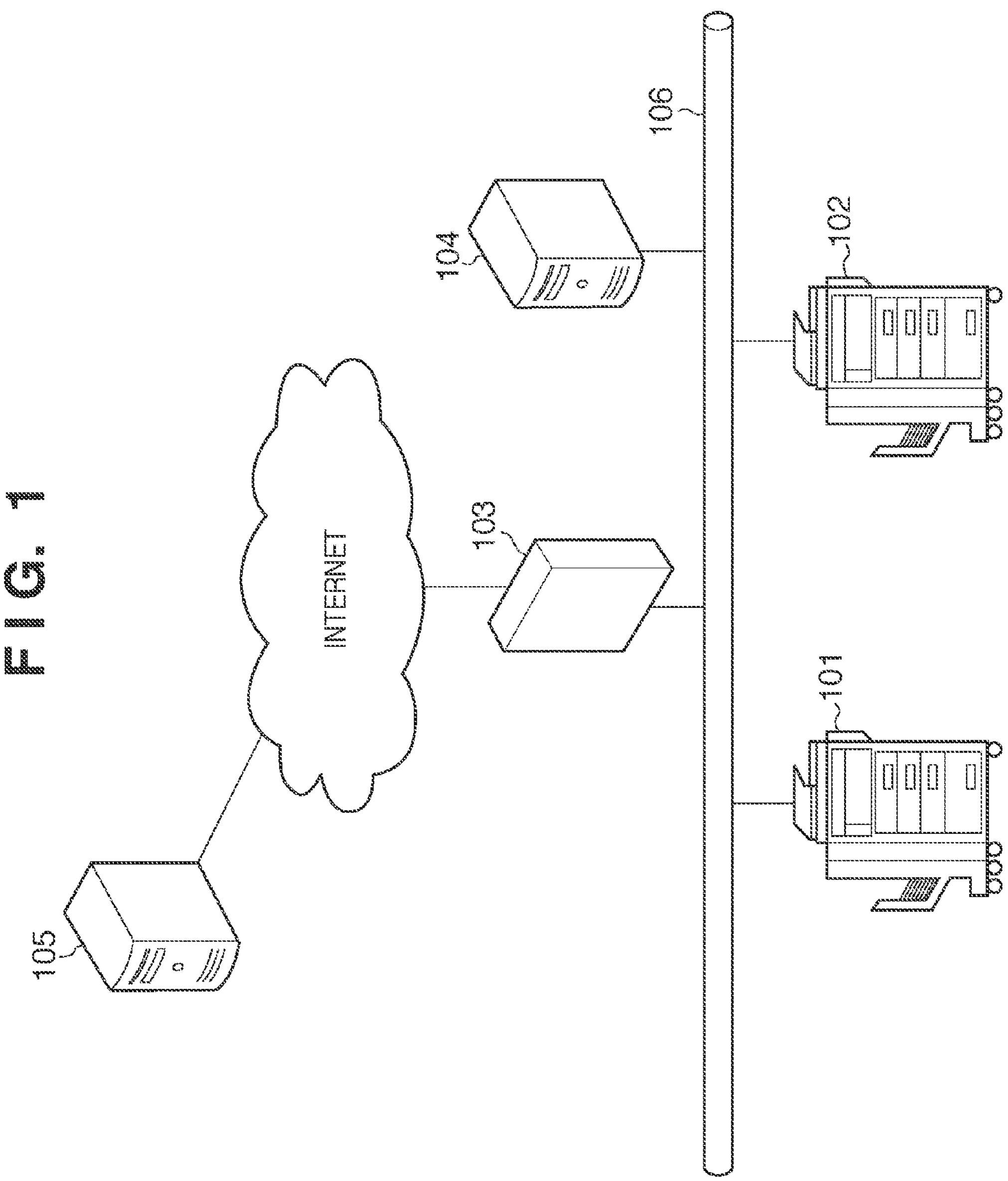
F I G. 1
INTERNET
101
102
103
104
105
106

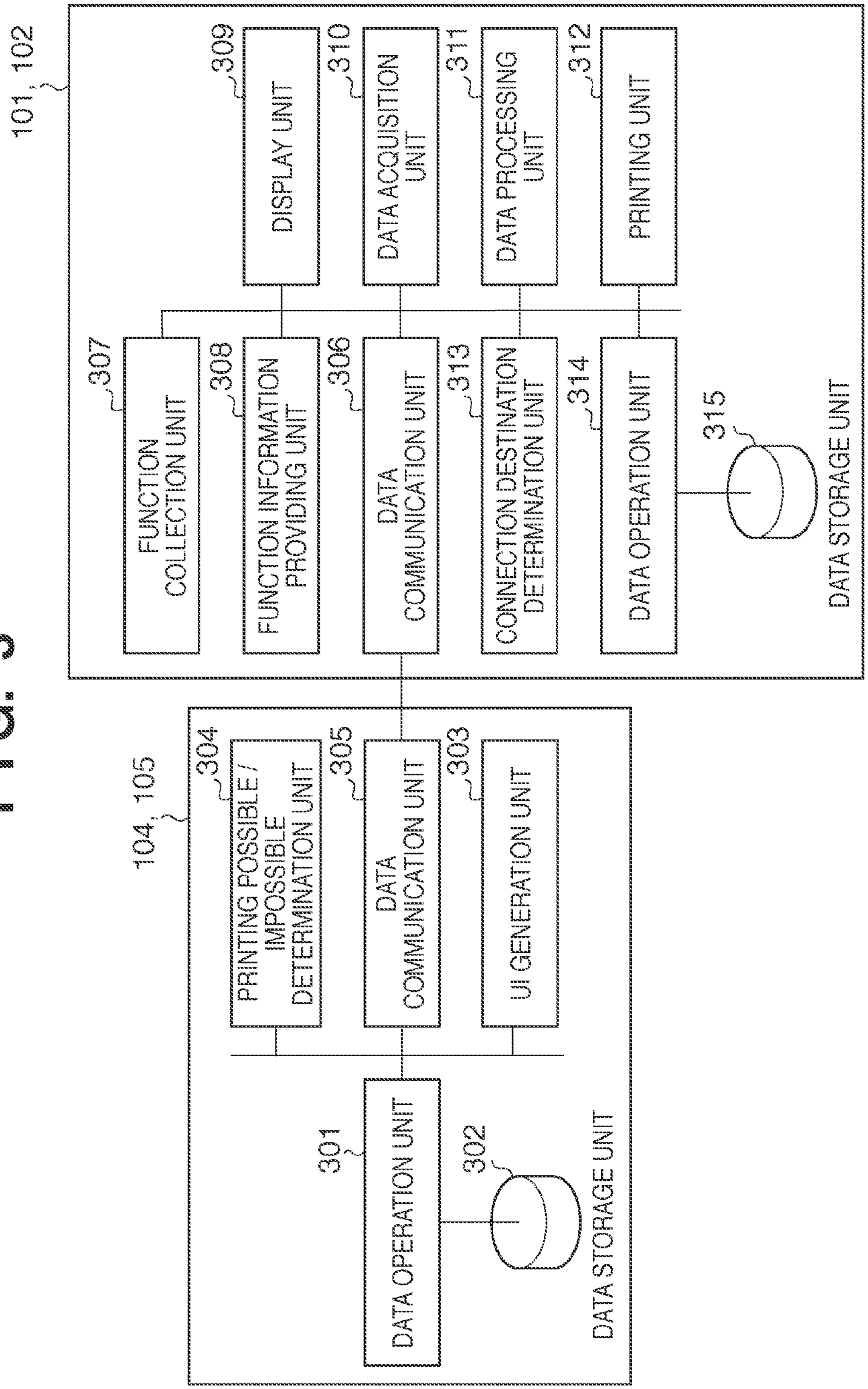

FIG. 3
101, 102
309
DISPLAY UNIT
310
DATA ACQUISITION UNIT
311
DATA PROCESSING UNIT
312
PRINTING UNIT
307
FUNCTION COLLECTION UNIT
308
FUNCTION INFORMATION PROVIDING UNIT
306
DATA COMMUNICATION UNIT
313
CONNECTION DESTINATION DETERMINATION UNIT
314
DATA OPERATION UNIT
315
DATA STORAGE UNIT
104, 105
304
PRINTING POSSIBLE / IMPOSSIBLE DETERMINATION UNIT
305
DATA COMMUNICATION UNIT
303
UI GENERATION UNIT
301
DATA OPERATION UNIT
302
DATA STORAGE UNIT

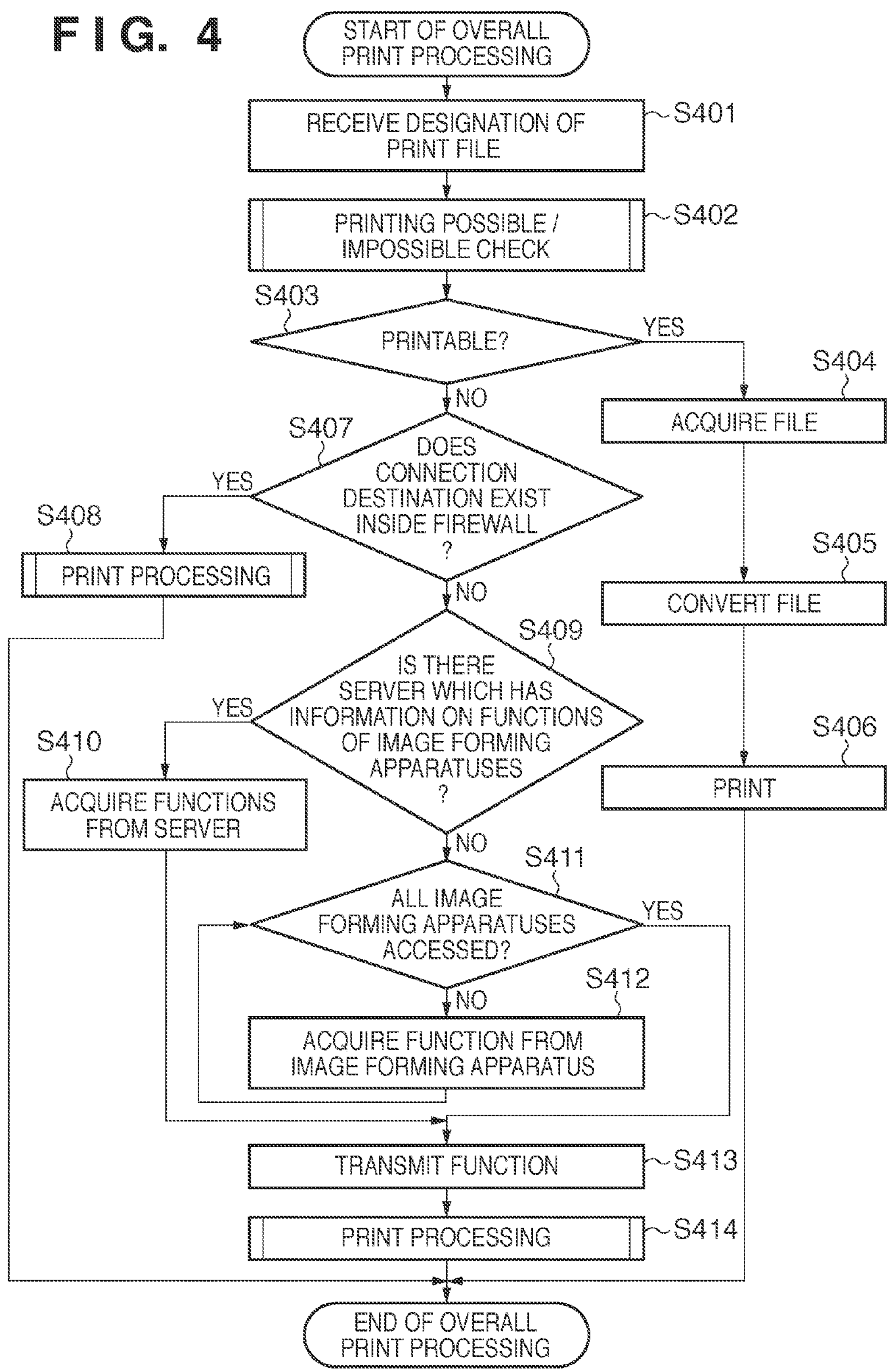
F I G. 4
START OF OVERALL PRINT PROCESSING
RECEIVE DESIGNATION OF PRINT FILE
S401
PRINTING POSSIBLE / IMPOSSIBLE CHECK
S402
S403
PRINTABLE?
YES
NO
S404
ACQUIRE FILE
S405
CONVERT FILE
S406
PRINT
S407
DOES CONNECTION DESTINATION EXIST INSIDE FIREWALL ?
YES
NO
S408
PRINT PROCESSING
S409
IS THERE SERVER WHICH HAS INFORMATION ON FUNCTIONS OF IMAGE FORMING APPARATUSES ?
YES
NO
S410
ACQUIRE FUNCTIONS FROM SERVER
S411
ALL IMAGE FORMING APPARATUSES ACCESSED?
YES
NO
S412
ACQUIRE FUNCTION FROM IMAGE FORMING APPARATUS
TRANSMIT FUNCTION
S413
PRINT PROCESSING
S414
END OF OVERALL PRINT PROCESSING

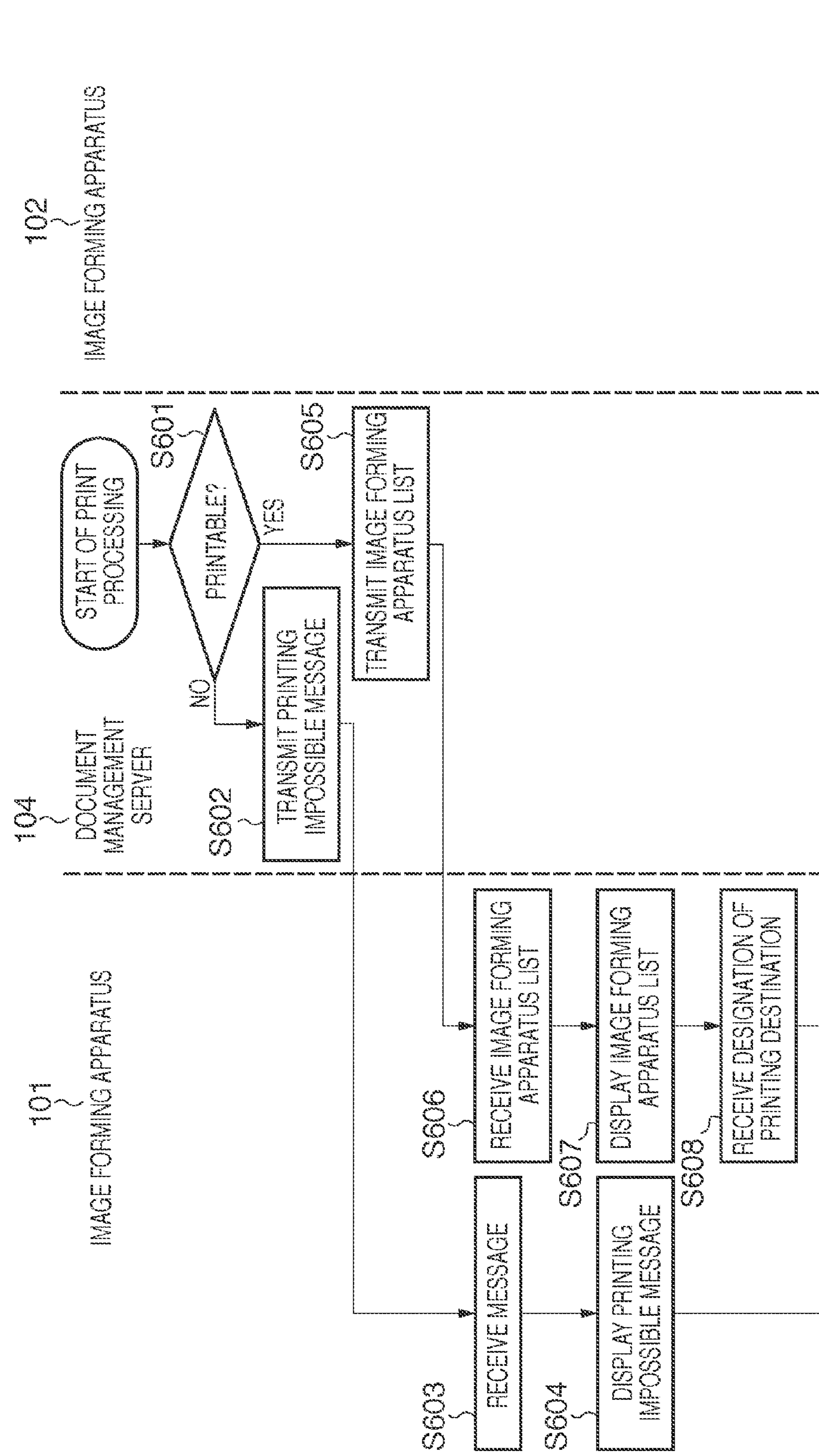
FIG. 6A
101
IMAGE FORMING APPARATUS
104
DOCUMENT MANAGEMENT SERVER
102
IMAGE FORMING APPARATUS
START OF PRINT PROCESSING
S601
PRINTABLE?
YES
NO
S602
TRANSMIT PRINTING IMPOSSIBLE MESSAGE
S605
TRANSMIT IMAGE FORMING APPARATUS LIST
S603
RECEIVE MESSAGE
S604
DISPLAY PRINTING IMPOSSIBLE MESSAGE
S606
RECEIVE IMAGE FORMING APPARATUS LIST
S607
DISPLAY IMAGE FORMING APPARATUS LIST
S608
RECEIVE DESIGNATION OF PRINTING DESTINATION

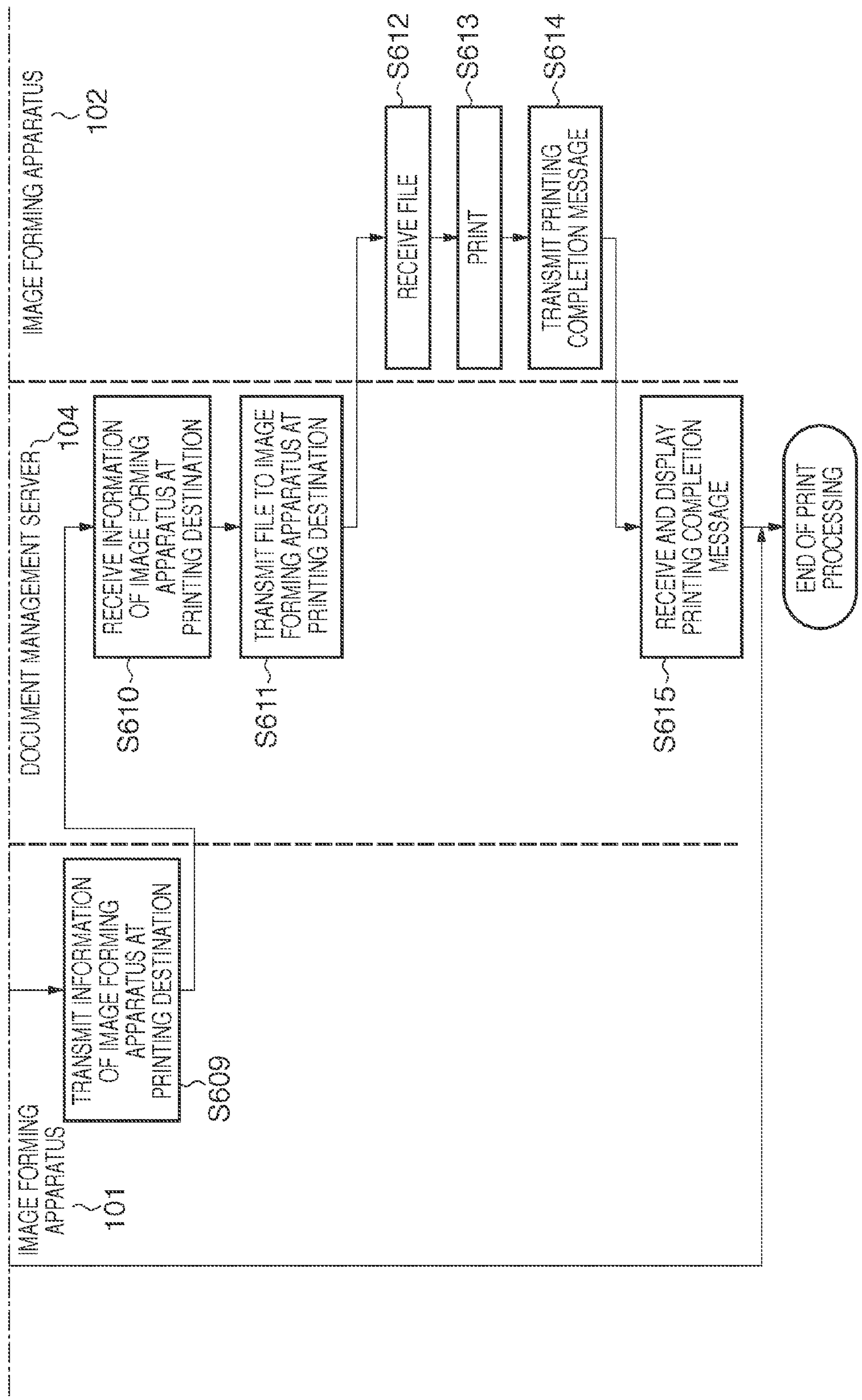

FIG. 6B
IMAGE FORMING APPARATUS
101
DOCUMENT MANAGEMENT SERVER
104
IMAGE FORMING APPARATUS
102
TRANSMIT INFORMATION OF IMAGE FORMING APPARATUS AT PRINTING DESTINATION
S609
RECEIVE INFORMATION OF IMAGE FORMING APPARATUS AT PRINTING DESTINATION
S610
TRANSMIT FILE TO IMAGE FORMING APPARATUS AT PRINTING DESTINATION
S611
RECEIVE FILE
S612
PRINT
S613
TRANSMIT PRINTING COMPLETION MESSAGE
S614
RECEIVE AND DISPLAY PRINTING COMPLETION MESSAGE
S615
END OF PRINT PROCESSING

F I G. 7A
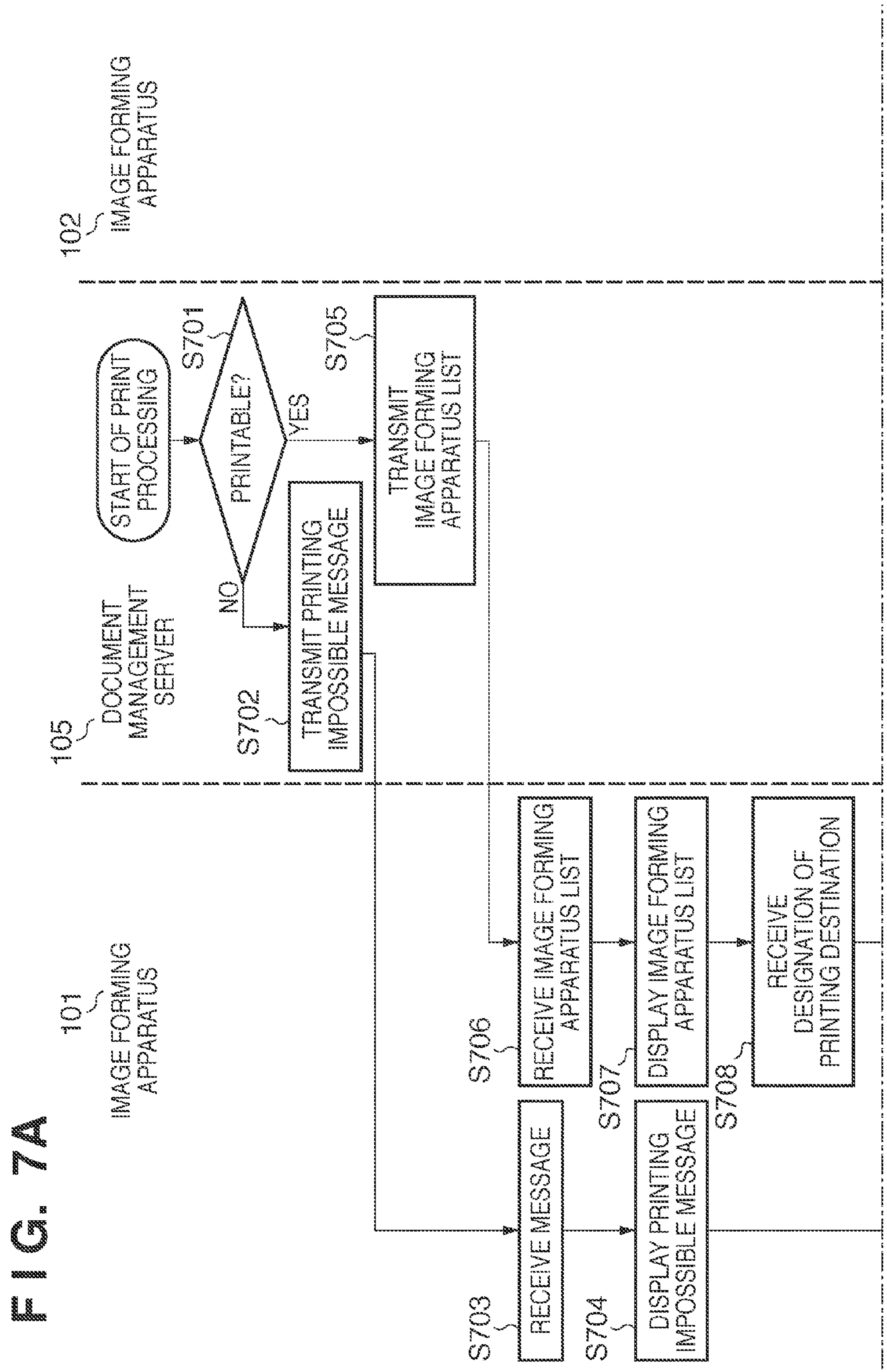

IMAGE FORMING APPARATUS
101
DOCUMENT MANAGEMENT SERVER
105
IMAGE FORMING APPARATUS
102
S709
INSTRUCT DESIGNATED IMAGE FORMING APPARATUS TO ACQUIRE FILE
S710
RECEIVE ACQUISITION INSTRUCTION
S711
ACQUIRE FILE
S712
PRINT
S713
TRANSMIT PRINTING COMPLETION MESSAGE
S714
RECEIVE AND DISPLAY PRINTING COMPLETION MESSAGE
END OF PRINT PROCESSING

| IMAGE FORMING APPARATUS ID | GROUP ID |
|---|---|
| 001 | G03 |
| 002 | G01 |
| 003 | G01 |
| 004 | G05 |
| 005 | G03 |

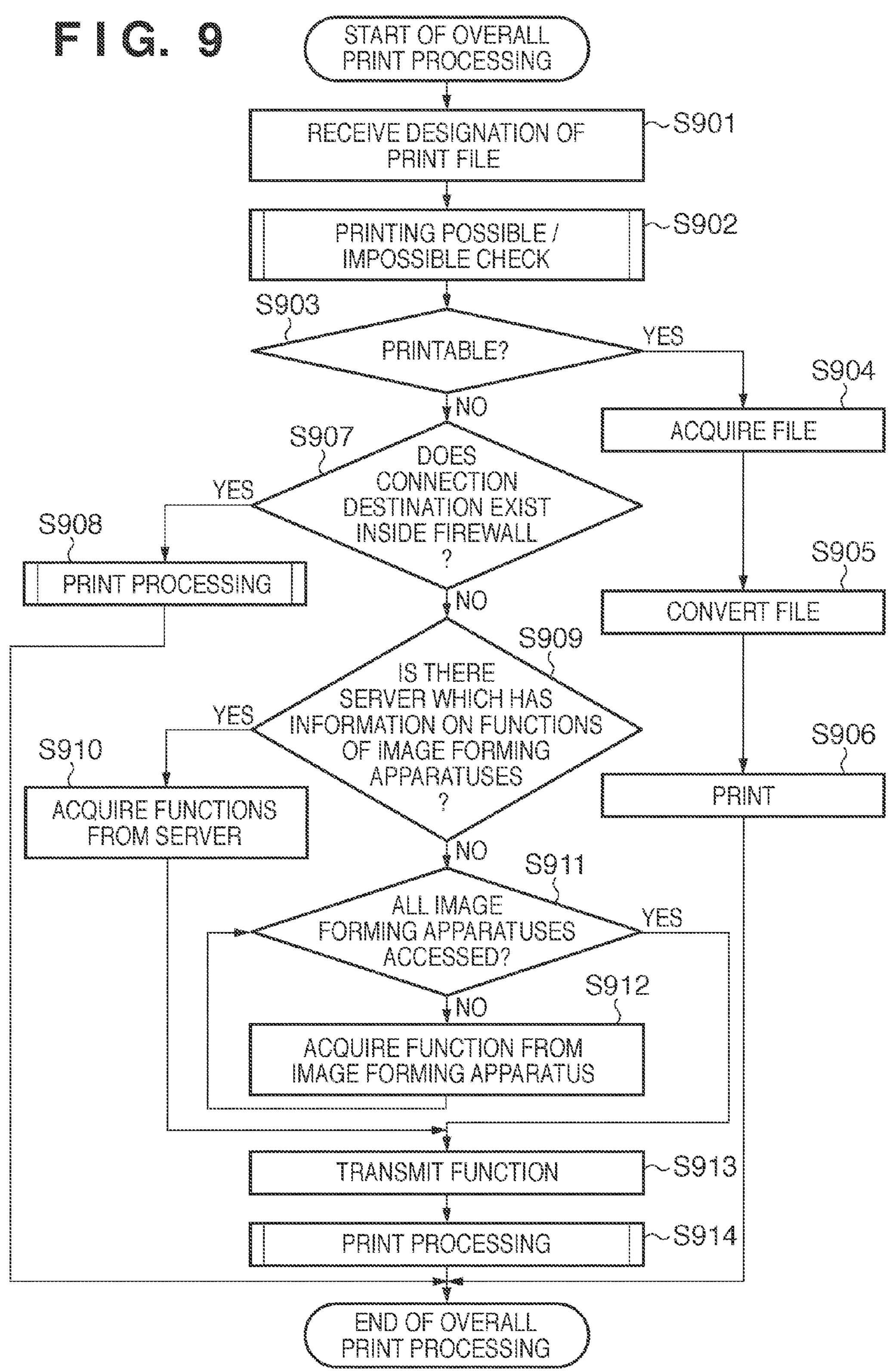
FIG. 9
START OF OVERALL PRINT PROCESSING
RECEIVE DESIGNATION OF PRINT FILE
S901
PRINTING POSSIBLE / IMPOSSIBLE CHECK
S902
S903
PRINTABLE?
YES
NO
S904
ACQUIRE FILE
S907
DOES CONNECTION DESTINATION EXIST INSIDE FIREWALL ?
YES
S908
PRINT PROCESSING
NO
S905
CONVERT FILE
S909
IS THERE SERVER WHICH HAS INFORMATION ON FUNCTIONS OF IMAGE FORMING APPARATUSES ?
YES
S910
ACQUIRE FUNCTIONS FROM SERVER
S906
PRINT
NO
S911
ALL IMAGE FORMING APPARATUSES ACCESSED?
YES
NO
S912
ACQUIRE FUNCTION FROM IMAGE FORMING APPARATUS
TRANSMIT FUNCTION
S913
PRINT PROCESSING
S914
END OF OVERALL PRINT PROCESSING

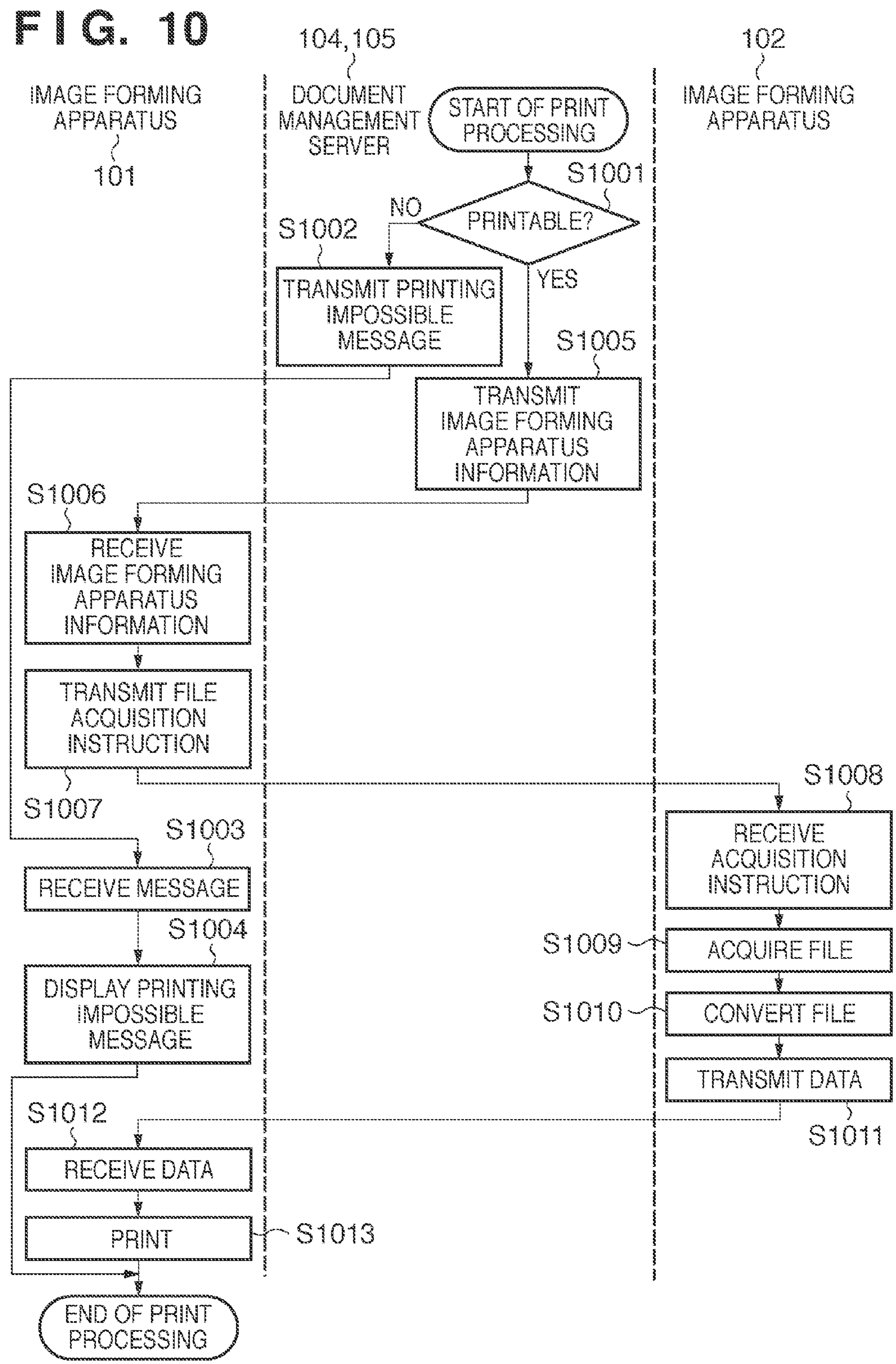
F I G. 10
104,105
102
IMAGE FORMING APPARATUS
101
DOCUMENT MANAGEMENT SERVER
START OF PRINT PROCESSING
IMAGE FORMING APPARATUS
S1001
PRINTABLE?
NO
YES
S1002
TRANSMIT PRINTING IMPOSSIBLE MESSAGE
S1005
TRANSMIT IMAGE FORMING APPARATUS INFORMATION
S1006
RECEIVE IMAGE FORMING APPARATUS INFORMATION
TRANSMIT FILE ACQUISITION INSTRUCTION
S1007
S1008
RECEIVE ACQUISITION INSTRUCTION
S1003
RECEIVE MESSAGE
S1004
DISPLAY PRINTING IMPOSSIBLE MESSAGE
S1009
ACQUIRE FILE
S1010
CONVERT FILE
TRANSMIT DATA
S1011
S1012
RECEIVE DATA
PRINT
S1013
END OF PRINT PROCESSING

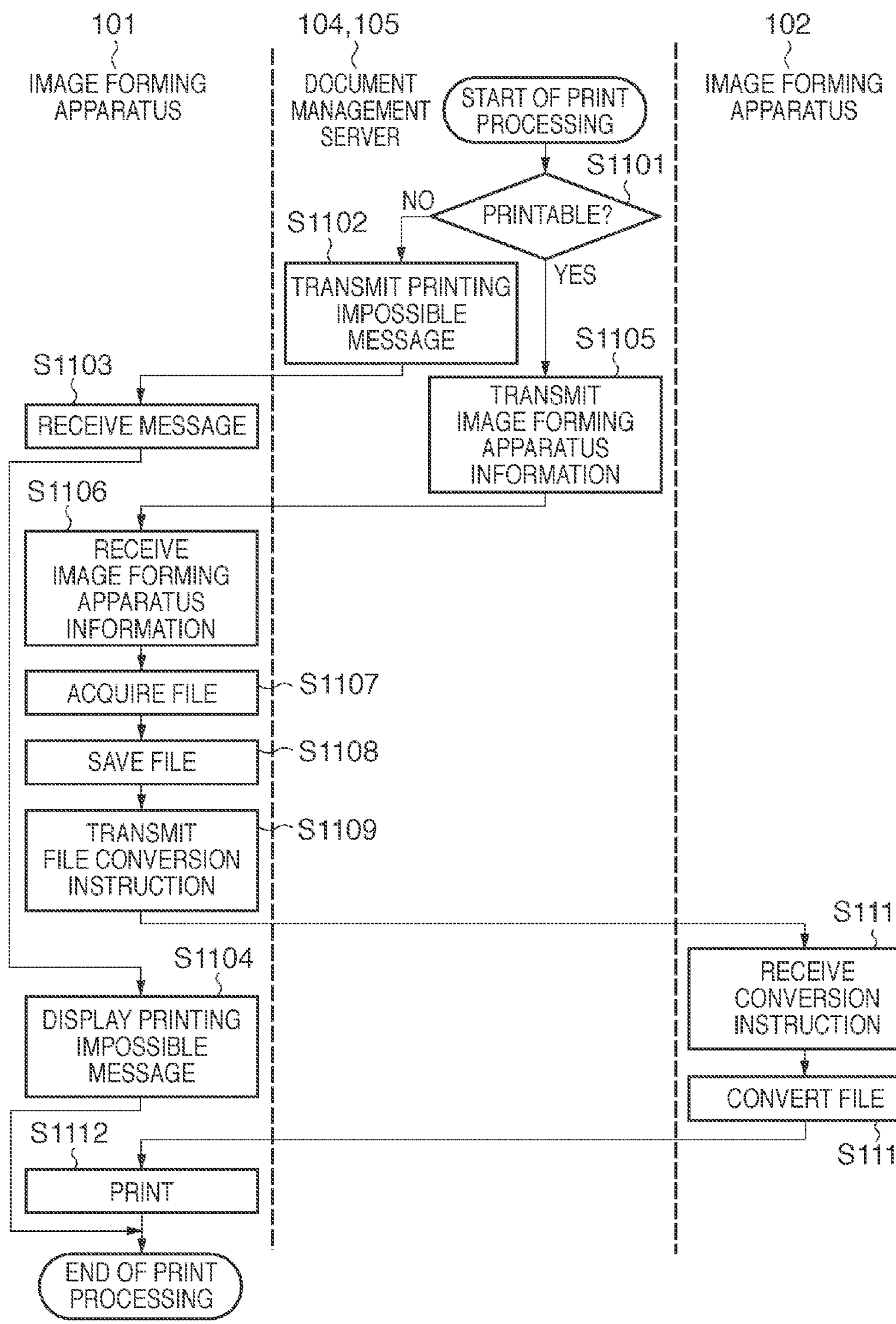
F I G. 11
101
IMAGE FORMING APPARATUS
104,105
DOCUMENT MANAGEMENT SERVER
102
IMAGE FORMING APPARATUS
START OF PRINT PROCESSING
S1101
PRINTABLE?
NO
YES
S1102
TRANSMIT PRINTING IMPOSSIBLE MESSAGE
S1103
RECEIVE MESSAGE
S1105
TRANSMIT IMAGE FORMING APPARATUS INFORMATION
S1106
RECEIVE IMAGE FORMING APPARATUS INFORMATION
ACQUIRE FILE
S1107
SAVE FILE
S1108
TRANSMIT FILE CONVERSION INSTRUCTION
S1109
S1110
RECEIVE CONVERSION INSTRUCTION
S1104
DISPLAY PRINTING IMPOSSIBLE MESSAGE
CONVERT FILE
S1111
S1112
PRINT
END OF PRINT PROCESSING

IMAGE FORMING APPARATUS AND CONTROL METHOD THEREFOR

BACKGROUND OF THE INVENTION

1. Field of the Invention

The present invention relates to a printing technique for a printing system including a document management server in a network, and an image forming apparatus which prints a document in the document management server.

2. Description of the Related Art

Direct printing in an image forming apparatus is a technique of transferring a file directly to an image forming apparatus without conversion of the file by a personal computer (PC), instead converting the file in the image forming apparatus, and printing. In other words, printing is possible even if neither an application nor a viewer is installed in the PC. However, the image forming apparatus needs to have a function of converting a file.

A substitute printing technique has been proposed as a technique of printing, by another image forming apparatus, a file or job which cannot be processed by an image forming apparatus that the user wants (for example, Japanese Patent Laid-Open No. 2008-152725).

In the conventional technique, a server which manages substitute printing grasps the function, that is, the printing capability, of each image forming apparatus. With the spread of cloud computing technology and the like, the server is highly likely to reside on the Internet. More specifically, the image forming apparatus and server exist in a network beyond a firewall and cannot communicate with each other. In this environment, the server cannot determine what kind of file is printable by each image forming apparatus in the current printing system status.

SUMMARY OF THE INVENTION

The present invention enables print processing even when a server exists in a network beyond the firewall of an image forming apparatus, like a cloud environment, and the image forming apparatus cannot print a document in the server.

According to one aspect of the present invention, there is provided an image forming apparatus which communicates with a document management server, the apparatus comprising: a determination unit which, when a document, printing of which is designated, does not have a printable file format, determines whether the document management server which manages the document exists on the same network as a network of the image forming apparatus; and a transmission unit which, when the determination unit determines that the document management server does not exist on the same network as the network of the image forming apparatus, acquires a file format printable by another image forming apparatus present on the same network, and transmits the file format to the document management server.

Further features of the present invention will become apparent from the following description of exemplary embodiments (with reference to the attached drawings).

BRIEF DESCRIPTION OF THE DRAWINGS

FIG. 1 is a view exemplifying the configuration of a printing system;

FIG. 3 is a block diagram exemplifying the software configurations of the document management server and the image forming apparatus;

FIG. 4 is a flowchart showing print processing in the first embodiment;

FIGS. 6A and 6B are flowcharts showing processing of substitute printing a document managed by a document management server inside the firewall;

FIGS. 7A and 7B are flowcharts showing processing of substitute printing a document managed by a document management server outside the firewall;

FIG. 8 is a table for managing image forming apparatuses in group;

FIG. 9 is a flowchart showing print processing in the second embodiment;

FIG. 10 is a flowchart showing processing of converting a file format by another image forming apparatus; and FIG. 11 is a flowchart showing processing of executing only conversion processing by another image forming apparatus.

DESCRIPTION OF THE EMBODIMENTS

Figure 2:
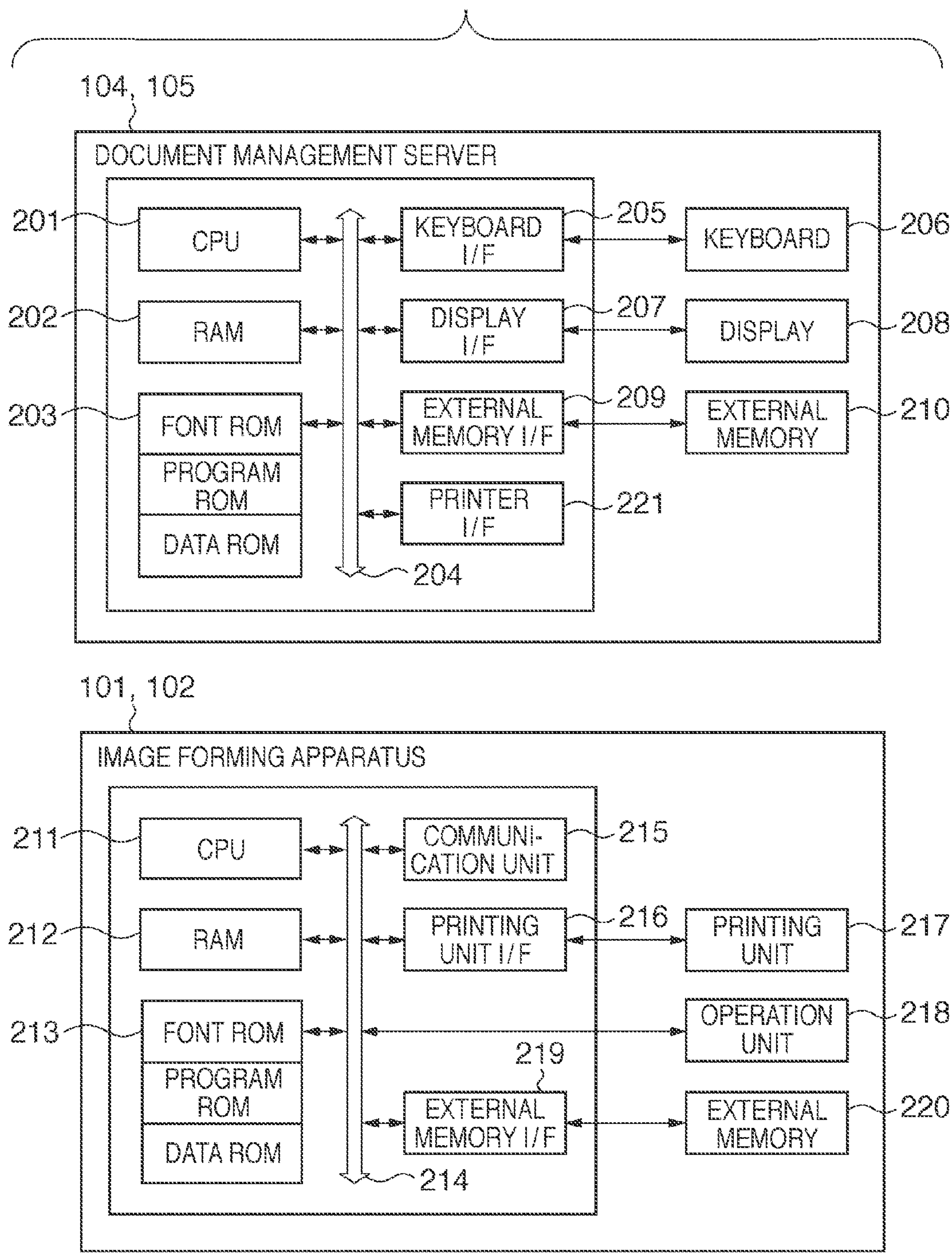
FIG. 2 is a block diagram exemplifying the hardware configurations of a document management server and image forming apparatus.

Preferred embodiments of the present invention will be described in detail below with reference to the accompanying drawings.

First Embodiment

The first embodiment according to the present invention will be described with reference to FIGS. 1 to 8. The first embodiment will explain substitute print processing by another image forming apparatus when a server exists in a network beyond the firewall of an image forming apparatus, like a cloud environment, and a target image forming apparatus cannot print a document (print file) in the server.

FIG. 1 is a view exemplifying the configuration of a printing system. As shown in FIG. 1, the printing system includes at least image forming apparatuses 101 and 102, document management servers 104 and 105, and a firewall 103. The document management servers 104 and 105 store various kinds of files, and provide services such as file browsing, editing, search, and the like to the image forming apparatuses 101 and 102.

The image forming apparatuses 101 and 102 print files stored in the document management servers 104 and 105 in accordance with a user request. The image forming apparatuses 101 and 102 can communicate data with each other. The document management servers 104 and 105 are accessed via the operation screens of the image forming apparatuses 101 and 102.

The image forming apparatuses 101 and 102 and the document management server 104 are connected via a network 106 such as Ethernet®. The document management server 105 is connected to the Internet via the firewall 103.

The firewall 103 is a general firewall, and prevents one-way communication from the external Internet to an intranet (network 106 in this example). That is, the document management server 105 cannot access the image forming apparatuses 101 and 102 and the document management server 104.

Although the image forming apparatuses 101 and 102 basically have the same functions, the image forming apparatus 101 is defined as an apparatus directly accessed by the user, and the image forming apparatus 102 is defined as an apparatus which takes charge of substitute printing. Although the document management servers 104 and 105 basically have the same functions, the document management server 104 is defined as a server present in the network 106 similarly to the image forming apparatuses 101 and 102, and the document management server 105 is defined as a server present on the Internet.

Note that the present invention is applicable to a printing system regardless of whether it is a single device or a system formed from a plurality of devices, as long as the functions of the present invention are executed. Access to the document management servers 104 and 105 may use an appropriate client terminal (personal computer) instead of the image forming apparatuses 101 and 102.

The hardware configurations of the document management servers 104 and 105 and the image forming apparatuses 101 and 102 shown in FIG. 1 will be exemplified with reference to FIG. 2. Each of the document management servers 104 and 105 includes a CPU 201 which comprehensively controls devices connected to a system bus 204. The CPU 201 implements processing of each flowchart to be described later.

A program ROM in a ROM 203, or an external memory 210 stores an operating system serving as the control program of the CPU 201, and the like. A font ROM in the ROM 203, or the external memory 210 stores font data used for document processing, and the like. A data ROM in the ROM 203, or the external memory 210 stores various data used in document processing. A RAM 202 functions as a main memory, work area, and the like for the CPU 201.

A keyboard I/F 205 controls a key input from a keyboard 206 or a pointing device (not shown). A display I/F 207 controls display on a display 208. An external memory I/F 209 controls access to the external memory 210 such as a hard disk (HD) or a flexible disk (FD). The external memory 210 stores user files, a boot program, various applications, font data, and the like. A printer I/F 221 is connected to the image forming apparatus 101 or 102 via a predetermined interface, and executes communication control processing with the image forming apparatus 101 or 102.

Each of the image forming apparatuses 101 and 102 includes a CPU 211 which processes a document containing graphics, an image, a text, a table, and the like based on a document processing program or the like which is stored in a program ROM in a ROM 213 or an external memory 220. The CPU 211 outputs an image signal serving as output information to a printing unit I/F 216 connected to a system bus 214, based on a control program or the like. The CPU 211 communicates with the document management server 104 or 105 via a communication unit 215. The CPU 211 implements processing of each flowchart to be described later.

A program ROM in the ROM 213, the external memory 220, or the like stores a control program. A font ROM in the ROM 213 stores font data used to generate output information, and the like. A RAM 212 functions as a main memory, work area, and the like for the CPU 211, and is used as an output information rasterization area, environment data storage area, NVRAM, and the like.

A printing unit 217 receives an image signal from the printing unit I/F 216, and prints based on the image signal. An operation unit 218 includes an operation panel equipped with a switch, LED display, and the like to be operated by the user, and accepts an instruction from the user. The operation unit 218 displays various data, messages, and the like in the display region of the operation panel. The external memory 220 stores font data, emulation programs, form data, and the like. An external memory I/F 219 controls access to the external memory 220.

The software configurations of the document management servers 104 and 105 and the image forming apparatuses 101 and 102 shown in FIG. 1 will be exemplified with reference to FIG. 3. In each of the document management servers 104 and 105, a data operation unit 301 executes acquisition, storage, search, and the like for a file saved in a data storage unit 302. A UI (User Interface) generation unit 303 communicates with the data operation unit 301, and generates a UI screen. Note that the UI suffices to have a format displayable on a display unit 309 of the image forming apparatus 101 or 102. For example, the UI may be generated in a format browsable on a Web browser or the like.

A printing possible/impossible determination unit 304 determines whether at least one specific image forming apparatus can print a file designated by the user. The communicating image forming apparatus 101 or 102 notifies information of the image forming apparatus subjected to the determination. In the document management server 104, the data storage unit 302 may store this information in advance.

A data communication unit 305 exchanges data with a data communication unit 306 of the image forming apparatus 101 or 102 to transmit data generated by the above-mentioned units or receive data from the data communication unit 306. Note that each of these units or apparatuses consists of a CPU 201, RAM 202, ROM 203, HDD 210, and the like.

In each of the image forming apparatuses 101 and 102, a function collection unit 307 checks and collects the printable formats of image forming apparatuses present in a specific range. In this example, the printable formats are, for example, pdf and xps. The specific range may cover, for example, image forming apparatuses present within the same subnet (for example, IP addresses "192.168.0.0 to 192.168.0.255 for a subnet mask "255.255.255.0"). Further, the specific range may cover image forming apparatuses grouped in advance.

FIG. 8 is a table for managing image forming apparatuses in group. In this example, an image forming apparatus ID 801 of an image forming apparatus, and a group ID 802 of a group to which the image forming apparatus belongs are managed. A data storage unit 315 stores this table. In this example, the image forming apparatus IDs 801 "002" and "003" of image forming apparatuses are classified into a group "G01".

Referring back to FIG. 3, a function information providing unit 308 provides the document management server 104 or 105 with information of a file format printable by the self image forming apparatus. When the function collection unit 307 of another image forming apparatus inquires a printable file format, the function information providing unit 308 provides the information. The display unit 309 displays a UI generated by the UI generation unit 303 of the document management server 104 or 105, and accepts an operation from the user.

A data acquisition unit 310 acquires a file stored in the data storage unit 302 from the document management server 104 or 105, and transfers it to a data processing unit 311. The data processing unit 311 converts the acquired file into a printable format. The conversion method is a known technique, and a description thereof will be omitted. The data processing unit 311 can also execute remote conversion processing for a file stored in another image forming apparatus.

A printing unit 312 prints a converted file. A connection destination determination unit 313 determines whether a document management server at the connection destination exists outside or inside the firewall 103. As the determination method, for example, a list of connection destinations may be registered in advance. Alternatively, the determination may be made based on whether the IP address of the connection destination exists outside the subnet of the self image forming apparatus. More specifically, when the subnet mask is "255.255.255.0" and the IP address is "10.0.20.50", the connection destination determination unit 313 determines that the connection destination exists outside the subnet. A data operation unit 314 executes acquisition, storage, search, and the like for data saved in the data storage unit 315. Note that each of the units or apparatuses consists of a CPU 211, RAM 212, ROM 213, HDD 220, and the like.

Print processing in the first embodiment in the above-described arrangement will be explained with reference to a flowchart shown in FIG. 4. The display unit 309 of the image forming apparatus 101 displays information of the UI generation unit 303 on the operation unit 218. Further, the display unit 309 accepts designation of a print file from the user (step S401). At this time, one print file may be explicitly selected, or a plurality of files such as all files in a selected folder may be designated. In the following description, assume that one print file is selected. Note that the image forming apparatus 101 notifies the document management server of the file designated in step S401.

Then, the image forming apparatus 101 checks whether it can print the file (step S402). This processing will be further described with reference to a flowchart shown in FIG. 5. If the image forming apparatus 101 determines that it can print the file (YES in step S403), the data acquisition unit 310 of the image forming apparatus 101 acquires the file from the data storage unit 302 of the document management server via the data communication unit 306 (step S404). The data processing unit 311 converts the file into a printable format (step S405), and the printing unit 312 prints (step S406).

If the image forming apparatus 101 cannot print (NO in step S403), the connection destination determination unit 313 determines whether the document management server which holds the file exists outside or inside the firewall 103 (step S407). Note that substitute print processing (step S408) executed when the document management server exists inside the firewall 103 will be further described with reference to a flowchart shown in FIGS. 6A and 6B.

If the connection destination determination unit 313 determines in step S407 that the document management server exists outside the firewall 103, the function collection unit 307 checks whether there is a server which has information concerning file formats printable by image forming apparatuses within a specific range (step S409). This server is, for example, the document management server 104. If the function collection unit 307 determines in step S409 that there is such a server, it acquires a list of the functions of image forming apparatuses from the server (step S410).

If the function collection unit 307 determines in step S409 that there is no such server, it collects information of printable file formats from image forming apparatuses within the specific range (step S412). The function information providing unit 308 of an image forming apparatus which has received the inquiry sends back information of a file format printable by this image forming apparatus. After the end of collecting information from all image forming apparatuses within the specific range (YES in step S411), the data communication unit 306 transmits the collected information to the data communication unit 305 of a document management server (document management server 105 in this case) (step S413). The printing unit 312 then performs substitute print processing (step S414). Details of the substitute print processing will be further described with reference to a flowchart shown in FIGS. 7A and 7B.

Figure 5:
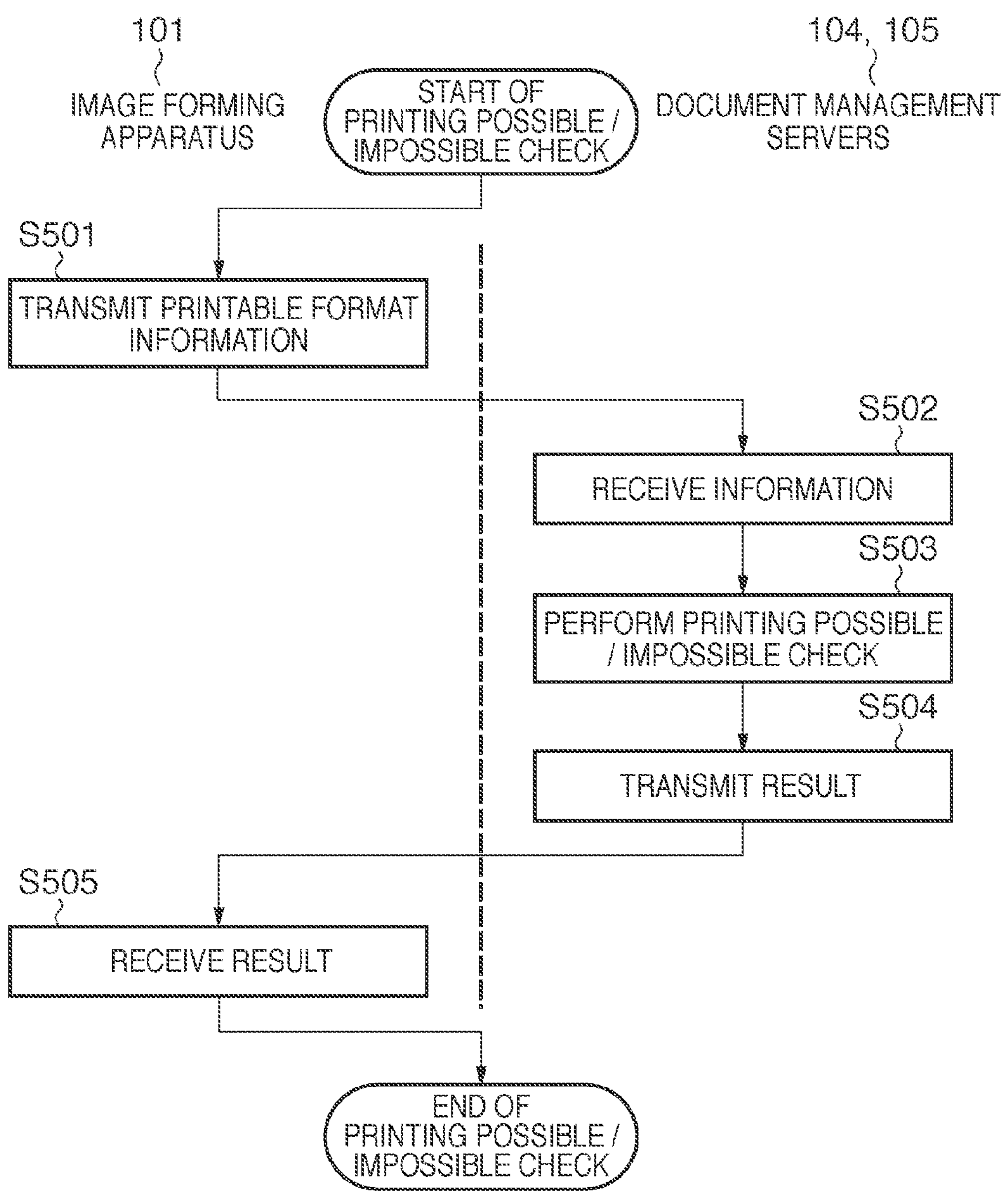
FIG. 5 is a flowchart showing processing of checking whether an image forming apparatus can print a file.

The processing (step S402) of checking by the image forming apparatus 101 whether it can print a file will be explained with reference to a flowchart shown in FIG. 5. The function information providing unit 308 of the image forming apparatus 101 transmits a printable file format to the document management server via the data communication unit 306 (step S501). The data communication unit 305 of the document management server receives the information (step S502), and the printing possible/impossible determination unit 304 determines whether the image forming apparatus 101 can print a file designated by the user (step S503). Since the document management server has received the printable file format in step S501, it can execute the process of step S503 based on the file format received in step S501 and the file format of the file designated in step S401.

The data communication unit 305 transmits the determination result (step S504), and the data communication unit 306 of the image forming apparatus 101 receives it (step S505). In the first embodiment, the document management server determines whether printing is possible, but a system in which the image forming apparatus determines it can also be adopted.

The processing (step S408) of substitute printing, by the image forming apparatus 102, the file in the document management server 104 present inside the firewall 103 will be explained with reference to FIGS. 6A and 6B. The printing possible/impossible determination unit 304 of the document management server 104 accesses the data storage unit 302 via the data operation unit 301, and checks whether there is an image forming apparatus capable of substitute printing the file (step S601). If there is no such image forming apparatus, the UI generation unit 303 generates a printing impossible message, and the data communication unit 305 transmits the message to the image forming apparatus 101 (step S602). The data communication unit 306 of the image forming apparatus 101 receives the message (step S603), and the display unit 309 displays the message (step S604).

If the printing possible/impossible determination unit 304 determines in step S601 that there is such an image forming apparatus, the printing possible/impossible determination unit 304 creates a list of image forming apparatuses capable of printing the file. The UI generation unit 303 generates the UI of the list, and transmits it to the image forming apparatus 101 via the data communication unit 305 (step S605). The data communication unit 306 of the image forming apparatus 101 receives the list (step S606), and the display unit 309 displays the list on the operation unit 218 (step S607). The display unit 309 accepts, from the user, a selection of an image forming apparatus to which substitute print (step S608). Assume that the selected image forming apparatus is the image forming apparatus 102. The data communication unit 306 of the image forming apparatus 101 transmits information of the designated image forming apparatus 102 to the document management server 104 (step S609).

The data communication unit 306 of the document management server 104 receives the information of the image forming apparatus (step S610). The data operation unit 301 acquires the file to be printed from the data storage unit 302, and the data communication unit 305 transmits it to the image forming apparatus 102 (step S611). Then, the data communication unit 306 of the image forming apparatus 102 receives the file (step S612). The data processing unit 311 converts the file into a printable format, and the printing unit 312 prints (step S613).

The data communication unit 306 transmits, to the image forming apparatus 101, a message that printing has started or has been completed (step S614). The data communication unit 306 of the image forming apparatus 101 receives the message, and the display unit 309 displays the message that the image forming apparatus 102 has started or completed printing (step S615).

Note that the document management server 104 exists in a network which does not go beyond the image forming apparatus 102 and firewall 103. Thus, the document management server 104 transmits a file to the image forming apparatus 102. However, the image forming apparatus 102 may acquire the file from the document management server 104.

In the above-described method, the user selects an image forming apparatus serving as the substitute printing destination. Alternatively, the document management server 104 may automatically select the substitute printing destination. As the determination method, the substitute printing destination may be registered in advance, or an image forming apparatus physically close to the image forming apparatus 101 may be selected.

Figure 7B:
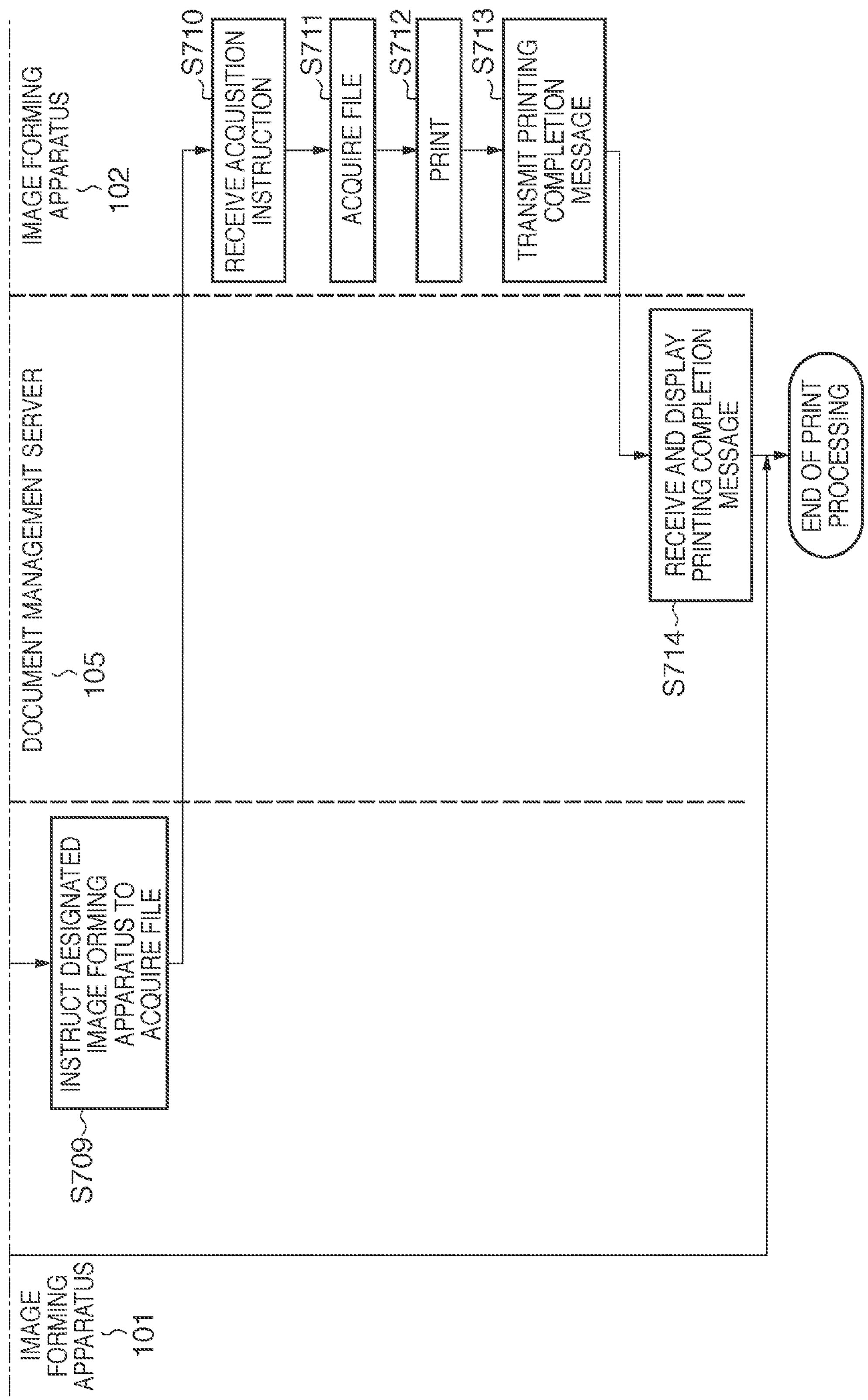

The processing (step S414) of printing, by the image forming apparatus 102, a file in the document management server 105 present outside the firewall 103 will be explained with reference to FIGS. 7A and 7B. Note that steps S701 to S708 are the same as steps S601 to S608 shown in FIG. 6A except that the server is not the document management server 104 but the document management server 105, so a description thereof will not be repeated.

In step S709, the data communication unit 306 of the image forming apparatus 101 transmits a printing instruction to the image forming apparatus 102 serving as the substitute printing destination together with information of the document management server 105 and information of a file to be printed. The data communication unit 306 of the image forming apparatus 102 receives the printing instruction (step S710), and the data acquisition unit 310 of the image forming apparatus 102 acquires the file to be printed from the document management server 105 (step S711). The data processing unit 311 of the image forming apparatus 102 converts the file into a printable format, and the printing unit 312 prints (step S712). Note that processes in steps S713 and S714 are the same as those in steps S614 and S615, and a description thereof will not be repeated.

As described above, when the server and the image forming apparatus exist separately in a network beyond the firewall, like a cloud environment, the server cannot detect the ability of the current image forming apparatus in the printing system. This is because the firewall 103 prevents one-way communication from the external Internet to an intranet (network 106 in this example), as described above. In this situation, conventionally, the server present outside the firewall cannot determine the ability of the current image forming apparatus and thus cannot determine an image forming apparatus to execute substitute printing in accordance with the current status.

However, according to the first embodiment, the image forming apparatus 101 transmits the function of an image forming apparatus present in the current printing system to the server outside the firewall (step S413). As a result, even the server outside the firewall can appropriately determine the substitute destination of a file designated by the user by using the function of an image forming apparatus present in the current printing system, implementing substitute printing.

Second Embodiment

The second embodiment according to the present invention will be described in detail with reference to the accompanying drawings. In the second embodiment, an image forming apparatus 102 performs only file conversion processing without executing substitute printing, and an image forming apparatus 101 prints, unlike the first embodiment.

Note that the configuration of a printing system and the hardware and software configurations of a server and image forming apparatus in the second embodiment are the same as those in FIGS. 1 to 3 in the first embodiment, a description thereof will not be repeated, and only a difference will be explained.

FIG. 9 is a flowchart showing print processing in the second embodiment. Note that this processing is the same as that in the first embodiment except that only steps S908 and S914 differ from steps S408 and S414 shown in FIG. 4. Processes in steps S908 and S914 are the same and will be explained, and the remaining processes in FIG. 9 will be omitted.

Next, processing of receiving a file in a document management server 104 or 105 by the image forming apparatus 102, converting it by the image forming apparatus 102, and printing it by the image forming apparatus 101 will be described with reference to FIG. 10. Note that steps S1001 to S1004 are the same as steps S601 to S604 shown in FIG. 6A except that the processing is applicable to even the document management server 105, and a description thereof will not be repeated.

A printing possible/impossible determination unit 304 of the document management server 104 or 105 selects one image forming apparatus capable of converting a file into a printable format, and transmits the information to the image forming apparatus 101 via a data communication unit 305 (step S1005). Assume that the selected image forming apparatus is the image forming apparatus 102.

A data communication unit 306 of the image forming apparatus 101 receives information about the selected image forming apparatus (step S1006). The data communication unit 306 of the image forming apparatus 101 transmits a file acquisition instruction to the image forming apparatus corresponding to the information (image forming apparatus 102 in the second embodiment) together with information of the document management server 104 or 105 and information of a file to be printed (step S1007). The data communication unit 306 of the image forming apparatus 102 receives the instruction (step S1008), and a data acquisition unit 310 of the image forming apparatus 102 acquires the file from the document management server 104 or 105 (step S1009). A data processing unit 311 of the image forming apparatus 102 converts the acquired file into a printable format (step S1010). Then, the data communication unit 306 transmits the converted file to the image forming apparatus 101 (step S1011). The data communication unit 306 of the image forming apparatus 101 receives the file converted by the image forming apparatus 102 (step S1012), and a printing unit 312 prints (step S1013).

When the server which holds the file is not the document management server 105 but the document management server 104, the document management server 104 may transmit the file to the image forming apparatus 102.

According to the second embodiment, the image forming apparatus 101 outputs a printed material, so the user does not need to afford the image forming apparatus 102 to collect output sheets.

Third Embodiment

The third embodiment according to the present invention will be described in detail with reference to the accompanying drawings. In the third embodiment, an image forming apparatus 101 acquires a file, instructs an image forming apparatus 102 to only convert the file in the image forming apparatus 101, and prints.

Note that the configuration of a printing system, and the hardware and software configurations of a server and image forming apparatus are the same as those in FIGS. 1 to 3 in the first embodiment. Print processing in the third embodiment is the same as that of FIG. 9 in the second embodiment, a description thereof will not be repeated, and only a difference will be explained.

Print processing of receiving and saving a file in a document management server 104 or 105 by the image forming apparatus 101, remotely converting it by the image forming apparatus 102, and printing it by the image forming apparatus 101 will be described with reference to FIG. 11. Note that steps S1101 to S1106 are the same as steps S1001 to S1006 in FIG. 10, and a description thereof will not be repeated.

In step S1107, a data acquisition unit 310 of the image forming apparatus 101 acquires a file from the document management server 104 or 105. A data operation unit 314 saves the acquired file in a data storage unit 315 (step S1108). A data communication unit 306 issues an instruction to the image forming apparatus 102 to convert the saved file into a printable format (step S1109).

The data communication unit 306 of the image forming apparatus 102 receives the conversion instruction (step S1110), and a data processing unit 311 converts the file saved in the data storage unit 315 of the image forming apparatus 101 into a format printable by the image forming apparatus 101 (step S1111). Then, a printing unit 312 of the image forming apparatus 101 prints the converted file (step S1112).

According to the third embodiment, similar to the second embodiment, the image forming apparatus 101 outputs a printed material, so the user does not need to afford the image forming apparatus 102 to collect output sheets.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-021588, filed Feb. 2, 2010, which is hereby incorporated by reference herein in its entirety.

What is claimed is:

1. An image forming apparatus capable of communicating with a document management server, the apparatus comprising:

at least one processor and memory coupled to each other and cooperating to act as:

a transmission unit which transmits information of a document designated in the image forming apparatus and information indicating a function of the image forming apparatus to the document management server to request determination processing for determining whether or not the image forming apparatus is capable of processing the designated document;

a first reception unit which receives a determination result of the determination processing;

a determination unit which, when the determination result indicates that the image forming apparatus is not capable of processing the designated document, determines whether the document management server is outside a firewall that the image forming apparatus is inside of;

an acquisition unit which, when said determination unit determines that the document management server is outside the firewall, acquires information about a function of another image forming apparatus;

a second transmission unit which transmits information about the function of the other image forming apparatus to the document management server;

a second reception unit which receives a list including at least one suitable image forming apparatus which is determined by the document management server from among image forming apparatuses based on the function which have been informed to the document management server and a file format of the designated document, wherein the suitable image forming apparatus is capable of converting the file format of the designated document;

a display unit which displays the list; and a direction unit which directs a suitable image forming apparatus selected from the list to acquire the designated document from the document management server and perform printing processing for the acquired document.

2. A method of controlling an image forming apparatus capable of communicating with a document management server, the method comprising:

a first transmission step, of transmitting information of a document designated in the image forming apparatus and information indicating a function of the image forming apparatus to the document management server to request determination processing for determining whether or not the image forming apparatus is capable of processing the designated document;

a first reception step of receiving a determination result of the determination processing;

a determination step of, when the determination result indicates that the image forming apparatus is not capable of processing the designated document, determining whether the document management server is outside a firewall that the image forming apparatus is inside of;

an acquisition step of, when the document management server is determined in said determination step to be outside the firewall, acquiring information about a function of another image forming apparatus;

a second transmission step of transmitting information about the function of the other image forming apparatus to the document management server;

a second reception step of receiving a list including at least one suitable image forming apparatus which is determined by the document management server from among image forming apparatuses based on the function which have been informed to the document management server and a file format of the designated document, wherein the suitable image forming apparatus is capable of converting the file format of the designated document;

a display step of displaying the list; and a direction step of directing a suitable image forming apparatus selected from the list to acquire the designated document from the document management server and perform printing processing for the acquired document, wherein said steps are performed by a computer.

3. A non-transitory computer-readable recording medium recording a program for causing a computer to execute a method of controlling an image forming apparatus capable of communicating with a document management server, the method comprising:

a first transmission step of transmitting information of a document designated in the image forming apparatus and information indicating a function of the image forming apparatus to the document management server to request determination processing for determining whether or not the image forming apparatus is capable of processing the designated document;

a first reception step of receiving a determination result of the determination processing;

a determination step of, when the determination result indicates that the image forming apparatus is not capable of processing the designated document, determining whether the document management server outside a firewall that the image forming apparatus is inside of;

an acquisition step of, when it is determined in said determination step that the document management server is outside the firewall, acquiring information about a function of another image forming apparatus;

a second transmission step of transmitting information about the function of the to the document management server;

a second reception step of receiving a list including at least one suitable image forming apparatus which is determined by the document management server from among image forming apparatuses based on the function which have been informed to the document management server and a file format of the designated document, wherein the suitable image forming apparatus is capable of converting the file format of the designated document;

a display step of displaying the list; and a direction step of directing a suitable image forming apparatus selected from the list to acquire the designated document from the document management server and perform printing processing for the acquired document.

* * * * *